July 3, 1923.

J. A. WHERRY

RECORD SHEET OR CARD

Filed June 14, 1922   2 Sheets-Sheet 1

NAME  JOHN DOE
ADDRESS  123 CAMP ST.

NAME  JOHN DOE
ADDRESS  123 CAMP ST.

| DATE | ITEMS | DEBITS | CREDITS | NEW BALANCE | OLD BALANCE |

Inventor
John A. Wherry
Chas. J. O'Neill
ATTORNEY

July 3, 1923.
J. A. WHERRY
RECORD SHEET OR CARD
Filed June 14, 1922  2 Sheets-Sheet 2
1,460,776
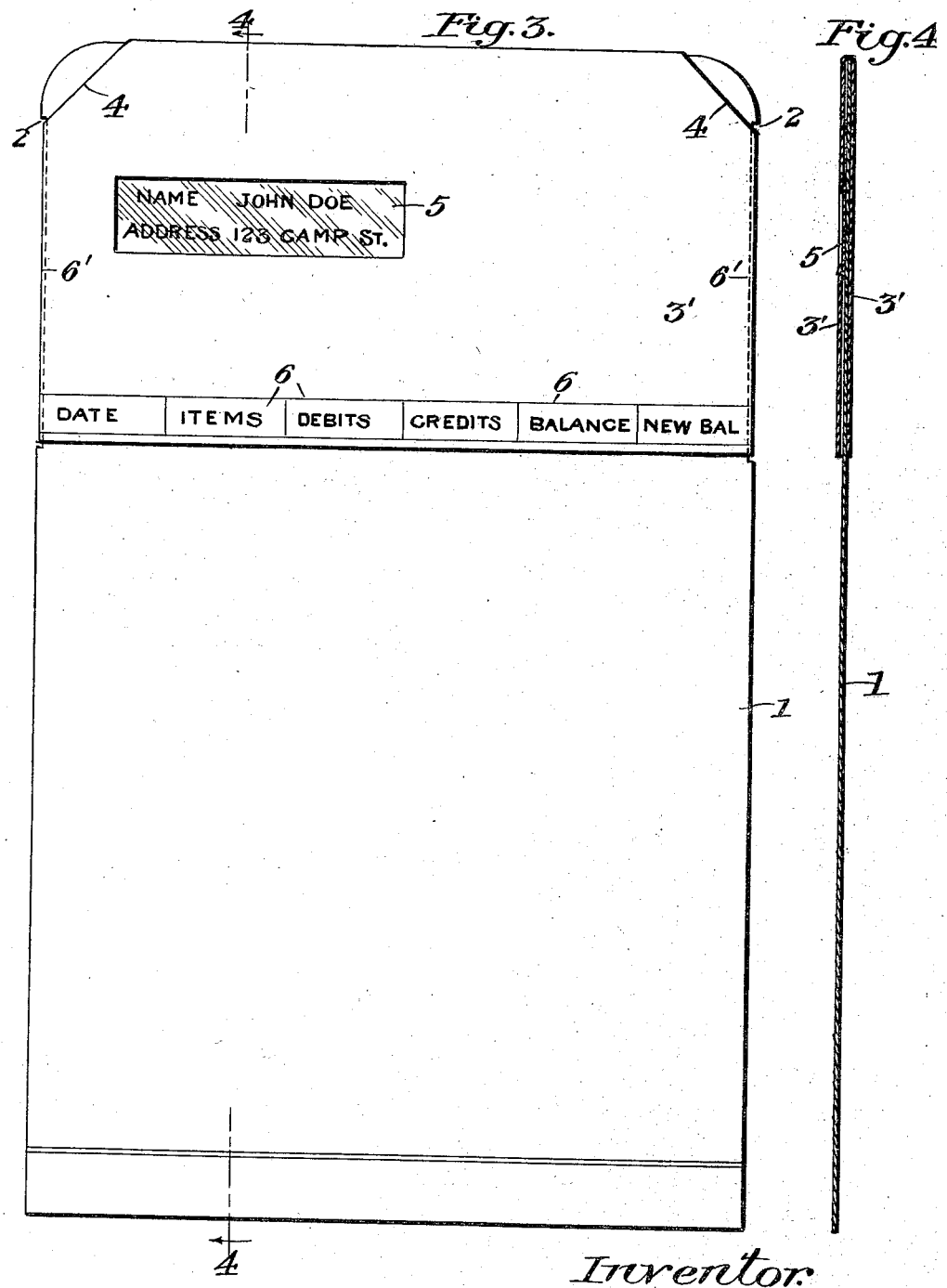

Patented July 3, 1923.

1,460,776

UNITED STATES PATENT OFFICE.

JOHN ASHLAND WHERRY, OF NEW ORLEANS, LOUISIANA.

RECORD SHEET OR CARD.

Application filed June 14, 1922. Serial No. 568,193.

*To all whom it may concern:*

Be it known that I, JOHN A. WHERRY, a citizen of the United States, residing at 5911 Prytania Street, in the city of New Orleans, parish of Orleans, State of Louisiana, have invented certain new and useful Improvements in Record Sheets or Cards; and I do hereby declare the following to be a full, clear, and exact description of the invention, such as will enable others skilled in the art to which it appertains to make and use the same.

The invention relates to a novel form of record sheet or card including a removable and transposable band-like member adapted to transversely surround the upper portion of the sheet, with self-contained means for effecting interlocking engagement between said sheet and band, the band preferably being provided with heading and spacing indicia, such as would ordinarily be applied to the sheet, in whole or in part, whereby the band may be adjusted so that the indicia may be applied in proper relation to either side of the sheet as a guide for inscribing record data on the latter, and, when a given sheet has been filled, may be removed therefrom and applied to another similar sheet.

The invention is illustrated in the accompanying drawings, in which,

Fig. 1 is a face view of a record sheet having the continuous band caption element applied thereto;

Fig. 2 is a section on line 2—2 of Fig. 1;

Fig. 3 is a view similar to that in Fig. 1 showing a modified form of the device;

Fig. 4 is a section on a line 4—4 of Fig. 3.

Referring to Figs. 1 and 2, 1 indicates a record sheet or card adapted to receive data thereon in predetermined order or relation, and preferably applied by the ordinary typewriting machine. For the purpose of illustration, the sheet 1 is represented as a ledger sheet such as commonly employed either in the card ledger systems, or in loose-leaf account books. Ordinarily, it is necessary to have these sheets specially ruled and spaced and provided with captions or headings to indicate the details or particulars of the data to be recorded thereon, and also contain blank spaces near the top in which the names, titles, addresses and so forth, are inscribed. The object of the present invention is to simplify the sheet by eliminating the usual headings and line rulings thereon, and supply the lack of these guides to the proper inscription of the record data by the provision of a special band-like element adapted to be applied at or near the top of the sheet and interlocked therewith, the band or envelope having printed thereon the appropriate data indicia, as well as the appropriate marks or indications of the columns and spaces in which the recorded data is to be inscribed.

To effect this purpose, each lateral edge of the sheet 1 is provided with a notch or indentation 2 of a length suitable to receive the folds of a continuous band 3 of paper or other suitable material, which is removably applied to and interlocked with the sheet 1 by bending the latter in a transverse direction and slipping the continuous band 3 over the top of the sheet and into engagement with the lateral edges thereof within the notches 2, whereby the band will surround and closely embrace the upper portion or heading section of the sheet. When employed for a ledger record, the sheet 1 may have the name and data of the particular party applied to the upper portion thereof, but all of the other indicating elements, including the column spacing indications and the heading indicia, are applied to one face of the continuous band 3, as indicated at 6, so that when the record on one face of sheet 1 has been completed, it is necessary only to remove the band 3 and apply the same in similar relation to the reverse side of the sheet. When both sides of the sheet have been written up, the heading band 3 is removed and applied to a new sheet.

It will be apparent that the band 3 may be made of stout paper or any other suitable flexible material, which will not add materially to the thickness of the record sheet and which will admit of the latter being readily inserted in and removed from an ordinary typewriting machine.

In order to provide a somewhat more durable and substantial heading or caption member to be readily interchanged on the same sheet and to be applied to successive sheets, the form shown in Figs. 3 and 4 may be employed, in which the removable band-like member 3' is formed as an envelope or pocket-like element having a closed top, with the upper corners cut away on a diagonal line as at 4, 4, leaving the bends or folds 6', 6', at the sides of a proper length to engage the notches 2, 2, formed in the lateral edges of the sheet 1, so that when the band-like element is slipped over the top of the sheet 1, it envelops the top edge as well as the lateral edges of the sheet 1, as indicated. The lower edge of one face of the band 3' is provided with the heading indicia and the column indexes 6 as in the preceding case. In order to properly display the name or indicating data as to the record sheet, the front face of the band 3' is provided with a sight opening 5, which is preferably covered by a transparent medium such as a sheet of celluloid, through which the name or other index in the caption space of the sheet 1 appears. As in the preceding form of the invention, the heading band or element may be readily applied to or removed from the sheet 1 by merely bending the same laterally, when the band may be easily slipped on or off of the sheet, the bending of the sheet permitting the folds 6' to either engage or disengage the notches 2, as will be understood. In some respects, this form of the invention, in which the upper portion of the band 3' envelops the top edge of the sheet 1, is preferable, in that it will facilitate the insertion and removal of the associated sheet and heading band in and from the typewriting machine, and offers no opportunity for the exposed edge of the caption band to come into contact with any of the operating elements of the typewriting machine, with the possible consequent damage to the heading band.

What I claim is:

1. The combination of a record sheet, a removable band of paper or the like transversely surrounding the upper portion of said sheet, and self-contained means for effecting interlocking engagement between said sheet and band to prevent movement of the band longitudinally of the sheet.

2. The combination of a record sheet, a removable continuous band of paper or the like transversely surrounding the upper portion of said sheet, and self-contained means for effecting interlocking engagement between said sheet and band to prevent movement of the band longitudinally of the sheet.

3. The combination of a record sheet having notches in the lateral edges thereof near the top and a removable continuous band of paper or the like transversely surrounding the upper portion of said sheet and engaging the lateral edges of said sheet and fitting within said notches.

4. The combination of a record sheet having notches in the lateral edges thereof near the top, a removable continuous band having a closed top and cut away top corners enveloping the upper portion of said sheet and having the lateral folds of said band engaging the lateral edges of said sheet within said notches.

5. The combination of a record sheet, a removable band of paper or the like transversely surrounding the upper portion of said sheet, and self-contained means for effecting interlocking engagement between said sheet and band to prevent movement of the band longitudinally of the sheet, said band having heading indicia thereon.

6. The combination of a record sheet, a removable band of paper or the like transversely surrounding the upper portion of said sheet, and self-contained means for effecting interlocking engagement between said sheet and band to prevent movement of the band longitudinally of the sheet, said band having heading and column indicia thereon.

In testimony whereof I affix my signature.

JOHN ASHLAND WHERRY.